(12) United States Patent
Taki

(10) Patent No.: US 9,783,011 B2
(45) Date of Patent: Oct. 10, 2017

(54) TIRE-PRESSURE MONITORING DEVICE

(71) Applicant: TOYOTA JIDOSHA KABUSHIKI KAISHA, Toyota-shi, Aichi-ken (JP)

(72) Inventor: Yuji Taki, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 134 days.

(21) Appl. No.: 14/995,912

(22) Filed: Jan. 14, 2016

(65) Prior Publication Data

US 2016/0214444 A1  Jul. 28, 2016

(30) Foreign Application Priority Data

Jan. 22, 2015 (JP) ................................. 2015-009980

(51) Int. Cl.
*B60C 23/04* (2006.01)
(52) U.S. Cl.
CPC ...... *B60C 23/0433* (2013.01); *B60C 23/0416* (2013.01); *B60C 23/0489* (2013.01)
(58) Field of Classification Search
CPC ............ B60C 23/0433; B60C 23/0489; B60C 23/0416
See application file for complete search history.

(56) References Cited

U.S. PATENT DOCUMENTS

| 2004/0134270 | A1* | 7/2004 | Hirohama | B60C 23/0416 |
| | | | | 73/146 |
| 2006/0012469 | A1* | 1/2006 | Hirai | B60C 23/061 |
| | | | | 340/445 |
| 2014/0075040 | A1* | 3/2014 | Chai | G06F 17/30044 |
| | | | | 709/230 |
| 2014/0088816 | A1* | 3/2014 | Shima | B60C 23/0416 |
| | | | | 701/29.1 |
| 2014/0172241 | A1 | 6/2014 | Shima et al. | |
| 2014/0354420 | A1* | 12/2014 | Terada | B60C 23/0408 |
| | | | | 340/442 |
| 2014/0371980 | A1 | 12/2014 | Sekizawa et al. | |

FOREIGN PATENT DOCUMENTS

JP   2013-159265 A   8/2013
WO   2012/140954 A1  10/2012

\* cited by examiner

*Primary Examiner* — Russell Frejd
(74) *Attorney, Agent, or Firm* — Oliff PLC

(57) ABSTRACT

A pulse count part acquires the minimum value among the numbers of pulse signals outputted by respective wheel-speed sensors during a wheel speed is within a minute low speed range. The pulse count part sets said minimum value as the numbers of the pulse signals of respective wheel-speed sensors during the wheel speed is within the minute low speed range, when the wheel speed increases out of said minute low speed range. Thereby, even when a vehicle stops in the middle of a wheel location discrimination treatment, a wheel location discrimination treatment can be continued using a proper pulse count value.

2 Claims, 10 Drawing Sheets

|     | PN1 | PN2 | PN3 | PN4 |
|-----|-----|-----|-----|-----|
| 1st | 3   | 3   | 3   | 3   |
| 2nd | 5   | 3   | 4   | 1   |
| 3rd | 7   | 3   | 6   | 56  |
| 4th | 10  | 3   | 10  | 54  |
| 5th | 12  | 3   | 11  | 52  |

TIRE-PRESSURE MONITORING DEVICE

TECHNICAL FIELD

The present invention relates to a tire-pressure monitoring device comprising wheel sensors fixed to respective wheels and a vehicle body side device fixed to a vehicle body, wherein the vehicle body side device performs a notification process according to a tire pressure by transmitting a tire-pressure information which represents a tire pressure from each wheel sensor to the vehicle body side device as a radio signal.

BACKGROUND ART

Conventionally, a tire-pressure monitoring device which informs a driver of a tire-pressure information has been known. A tire-pressure monitoring device comprises tire-pressure sensor units (referred to as wheel sensors) for detecting a tire pressure for respective wheels, and is configured to transmit a tire-pressure information as a radio signal from this wheel sensor and receive this radio signal by a vehicle body side device to acquire the tire-pressure information. When judged that the tire pressure has been reduced based on the received tire-pressure information, the vehicle body side device displays that on an annunciator to notify it to a driver.

In such a tire-pressure monitoring device, in order to distinguish from which wheel sensor the radio signal received by the vehicle body side device is transmitted, the radio signal contains a sensor ID which is an identification information of a wheel sensor, in addition to the tire-pressure information. The sensor ID is beforehand registered in the vehicle body side device in association with the wheel location where the wheel sensor is disposed. Therefore, the tire-pressure information can be distinctively acquired for every wheel.

However, when a tire rotation is performed or a wheel is replaced with another one, a registered relation between the sensor IDs and the wheel locations becomes wrong. For such an issue, a device proposed in the Patent Document 1 (PTL1) is configured to automatically distinguish the wheel locations of every wheel sensors. This device comprises an acceleration sensor built in a wheel sensor, detects the turning position of the acceleration sensor based on the gravitational acceleration component of the acceleration in a centrifugal force direction of a wheel detected by this acceleration sensor, and transmits a radio signal containing a tire pressure and a sensor ID at a timing when the turning position of the acceleration sensor is the uppermost.

On the other hand, a vehicle body side device is configured to detect the rotation locations of the respective wheels based on the count values of pulse signals (referred to as wheel-speed pulses) outputted by the wheel-speed sensors, and samples the rotation location data (count values of pulse signals) of the respective wheels whenever it receives the radio signal from the wheel sensor. The wheel sensors rotate integrally with the wheels to which they are attached. For this reason, whenever the wheel sensor and the wheel-speed sensor are disposed corresponding to a common wheel (identical wheel), the wheel rotation location at a transmission timing of the wheel sensor will be always a constant location fundamentally. Using this, the vehicle body side device calculates the variation degree of each rotation location data for every sensor ID, and determines, as a wheel to which the wheel sensor is attached, the wheel with little variation in the rotation location at the transmission timing.

Hereafter, the treatment for specifying the wheel to which each wheel-speed sensor is attached will be referred to as a wheel location discrimination treatment.

When a vehicle stops in the middle of the wheel location discrimination treatment, a wheel-speed pulse may be counted up by disturbance such as an oscillation even though the wheel is not rotating. For such an issue, the device proposed in the Patent Document 1 (PTL1) is configured to judge whether the vehicle is stopping and to carry out a subtractive correction of the count values of the wheel-speed pulses counted during its stopping period.

CITATION LIST

Patent Literature

[PTL1] International Publication No. 2012-140954

SUMMARY OF INVENTION

However, even when it is judged that the vehicle is stopping, a wheel may rotate and a wheel-speed pulse may be counted in fact. Therefore, it cannot be distinguished whether the cause of count-up of a wheel-speed pulse is due to disturbance, such as an oscillation, or the fact that the wheel has been rotated actually. For this reason, the device proposed in the Patent Document 1 (PTL1) cannot properly correct the count value of a wheel-speed pulse, and cannot acquire a sufficient accuracy in wheel location discrimination.

Given such a situation, a conventional tire-pressure monitoring device is configured to stop a wheel location discrimination treatment when it is presumed that the vehicle has stopped during the wheel location discrimination and to restart the wheel location discrimination from the beginning after the vehicle starts running. For this reason, it becomes impossible to use the count value of the wheel-speed pulse sampled before the vehicle stopped, and the time period for completing the wheel location discrimination treatment will become long. Especially in the city with many traffic lights, such a tendency is strong since the frequency of a traffic light stop is high.

The objective of the present invention has been made in order to cope with the above-mentioned issue, and it is in shortening the time period for a wheel location discrimination treatment.

In order to attain the above-mentioned objective, the feature of the present invention is in that:

a tire-pressure monitoring device comprises:

a plurality of wheel sensors (10), each of which is fixed to each of wheels of a vehicle and detects a tire pressure of the wheel that it is fixed to, and transmits a tire-pressure information representing the detected tire pressure along with its specific sensor ID as a radio signal, and a vehicle body side device (50) which is fixed to a vehicle body and performs a notification process for informing a crew member of said vehicle of an information about the tire pressure of each of said wheels, using said sensor ID and said tire-pressure information acquired by receiving said radio signal and a previously memorized relation between said sensor IDs and wheel locations that are locations of said wheels with respective to said vehicle body; and each of said plurality of wheel sensors is configured to transmit said radio signal at a timing when a sensor turning position which is its turning position around each axle shaft is a predetermined transmitting position, and said vehicle body side device comprises:

a pulse count means (55) to integrate the number of a pulse signal, which is an output signal of each of a plurality of wheel-speed sensors disposed for each of said wheels and is outputted whenever each of said wheels rotates a predetermined angle, to acquire a pulse count value, for each of said wheel-speed sensors, and a discrimination means (54) to distinguish said wheel location of said wheel that each of said wheel sensors is fixed to, based on said pulse count values (PN1, PN2, PN3, PN4) at a point of time when receiving said radio signal transmitted from each of said wheel sensors, and update said previously memorized relation between said sensor IDs and said wheel locations based on the discrimination result, wherein:

said pulse count means comprises:

a speed evaluation means (S11 to S15) to judge whether a vehicle speed is within a predetermined minute low speed range, a minimum value acquisition means (S25) to integrate the number of said pulse signal which each of said wheel-speed sensors outputs during said speed evaluation means judges that said vehicle speed is within said minute low speed range, for each of said wheel-speed sensors, and to acquire the minimum value (Min(LN1, LN2, LN3, LN4)) among the integrated values, and a count value adjustment means (S26) to update said pulse count value for each of said wheel-speed sensors by setting the number of said pulse signal that each of said wheel-speed sensor had outputted during said vehicle speed was judged to be within said minute low speed range to said minimum value when said vehicle speed increases out of said minute low speed range.

The present invention comprises wheel sensors fixed to respective wheels and a vehicle body side device fixed to a vehicle body. Each wheel sensor respectively detects a tire pressure and transmits a tire-pressure information representing the detected tire pressure along with a sensor ID as a radio signal. The sensor ID is an identification information inherent to each of the wheel sensors, which specifies a wheel sensor. The vehicle body side device performs a notification process for informing a crew member of the vehicle of an information about the tire pressure of each of the wheels, using the sensor ID and the tire-pressure information acquired by receiving the radio signal transmitted by the wheel sensor and a previously memorized relation between the sensor IDs and wheel locations that are locations of the wheels with respective to the vehicle body.

The wheel sensors rotate around axle shafts in association with rotations of the wheels. Each of the wheel sensors transmits the radio signal at a timing when a sensor turning position which is its turning position around each axle shaft is a predetermined transmitting position.

Although it is necessary to register a relation between the sensor IDs of the wheel sensors and the wheel locations to manage a tire-pressure information for every wheel location, the registered relation between the sensor IDs and the wheel locations becomes wrong when a tire rotation is performed or a wheel is replaced with another one. In order to cope with such an issue, the vehicle body side device comprises a pulse count means and a discrimination means.

The pulse count means integrates the number of the pulse signal outputted by a plurality of the wheel-speed sensors disposed for respective wheels for every wheel-speed sensor to acquire pulse count values. Each wheel-speed sensor outputs a pulse signal whenever a wheel rotates a predetermined angle. Therefore, the angle by which the wheel rotated can be detected by integrating (counting) the number of the pulse signal. The count of the pulse signals may be started at any time.

The discrimination means distinguishes the wheel locations of the wheels to which the respective wheel sensors are fixed, based on the pulse count values at a point of time when receiving the radio signal transmitted from the respective wheel sensors, and updates the previously memorized relation between the sensor IDs and the wheel locations based on the discrimination result. The radio signal transmitted from the wheel sensor is transmitted at a timing when a sensor turning position which is a turning position around its own axle shaft comes to a predetermined transmitting position. For instance, the wheel sensor rotates integrally with the wheel to which it is attached. For this reason, whenever the wheel sensor and the wheel-speed sensor are disposed corresponding to a common wheel (identical wheel), the sensor turning position and the wheel rotation location detected based on the pulse count has an approximately constant relation. Using this, the discrimination means distinguishes the wheel location where each wheel sensor is fixed.

For instance, the discrimination means samples a plurality of pulse count values acquired by the pulse count means during a period since a radio signal transmitted from each wheel sensor is received until the next radio signal is received for every sensor ID, and distinguishes the wheel location in which the wheel sensor is disposed for every wheel sensor, based on the sampled pulse count value. This pulse count value may be a value to be reset whenever a wheel rotates one revolution, for example.

When the vehicle stops during the discrimination of the wheel location, a noise may be outputted by disturbance, such as an oscillation, from the wheel-speed sensor even though the wheel is not rotating. This noise will be counted as a pulse signal. Then, in the present invention, the pulse count means comprises a speed evaluation means, a minimum value acquisition means, and a count value adjustment means.

The speed evaluation means judges whether the vehicle speed is within a predetermined minute low speed range. Therefore, a minute low speed running condition, including a situation where it is presumed that the vehicle is stopping, can be detected. While the vehicle is stopping, the probability that the pulse signal due to a noise may be outputted synchronously from all the wheel-speed sensors is small. Using this, the minimum value acquisition means integrates the number of the pulse signal outputted by the respective wheel-speed sensors during the speed evaluation means judges that the vehicle speed is within the minute low speed range for every wheel-speed sensor, and acquires the minimum value among the integrated values. It can be presumed that this minimum value is a proper pulse count value (value corresponding to the rotation angle of the wheel) during the vehicle speed is judged to be within the minute low speed range.

The count value adjustment means updates the pulse count value for each of the wheel-speed sensors by setting the number of the pulse signal that the respective wheel-speed sensors had outputted during the vehicle speed was judged to be in the minute low speed range to the above-mentioned minimum value when the vehicle speed increases out of the minute low speed range. That is, the pulse count value for every wheel-speed sensor is updated so that the minimum acquired by the minimum value acquisition means is set as the number of the pulse signal of each wheel-speed sensor during the vehicle speed is judged to be within the minute low speed range.

Therefore, even when the vehicle has stopped during the discrimination of the wheel location, a count treatment of the pulse signal can be continued using a proper count value. For this reason, the pulse count value acquired before the vehicle stops by the pulse count means can be used effectively. As a result, in accordance with the present invention, the time period required for the wheel location discrimination treatment can be shortened.

The feature of one aspect of the present invention is in that:

the speed evaluation means is configured to judge that the vehicle speed has fallen within the minute low speed range when the number per unit time of the pulse signal outputted from each of the wheel-speed sensors becomes less than a first set value for all the wheel-speed sensors, and to judge that the vehicle speed has got out of the minute low speed range when the number per unit time of the pulse signal outputted from each of the wheel-speed sensors becomes equal to or larger than a second set value which is larger than the first set value for all the wheel-speed sensors.

In the one aspect of the present invention, since it is judged whether the vehicle speed is within the minute low speed range using the count value per unit time of the pulse signal of all the wheel-speed sensors, it can be easily and accurately judged whether the vehicle speed is within the minute low speed range. Moreover, the hysteresis (dead band) of the vehicle speed used for the evaluation can be set up properly.

In addition, in the above-mentioned explanation, in order to assist in understanding the present invention, although the reference signs used in embodiments in parenthesis are attached to the configuration of the invention corresponding to the embodiments, respective constituent elements of the invention are not limited to the embodiments specified with the above-mentioned reference signs.

BRIEF DESCRIPTION OF DRAWINGS

FIG. 10 is a diagram for showing a sampling result of a pulse number as an image.

DESCRIPTION OF EMBODIMENTS

Figure 1:
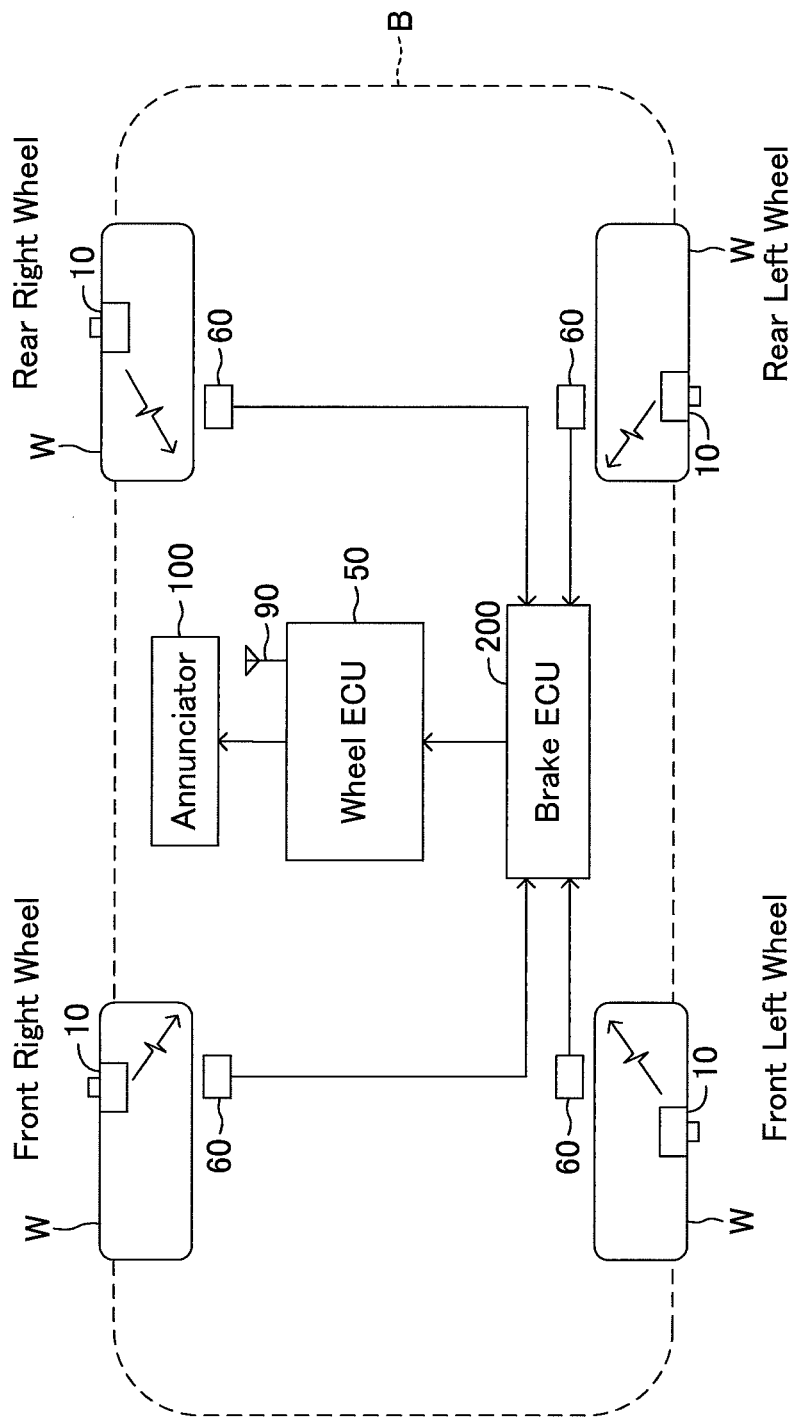
FIG. 1 is a schematic diagram of a tire-pressure monitoring device according to an embodiment of the present invention.
Figure 2:
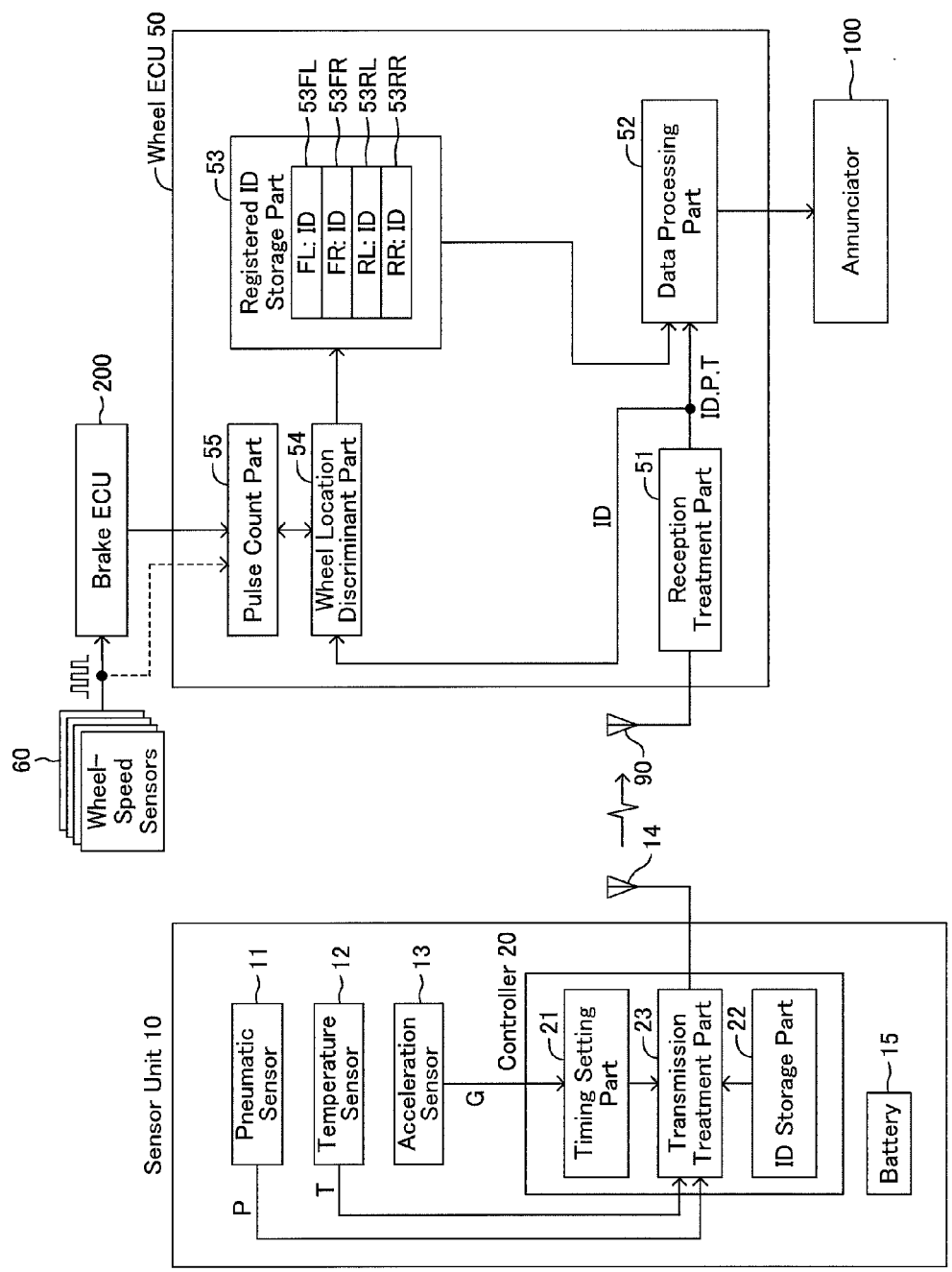
FIG. 2 is a functional block diagram in a sensor unit and a wheel ECU.

Hereafter, a tire-pressure monitoring device according to one embodiment of the present invention will be explained using drawings. FIG. 1 is a diagram for showing the schematic configuration of the tire-pressure monitoring device of a vehicle. The tire-pressure monitoring device is a device for informing a driver of an air pressure information of a tire, and comprises tire-pressure sensor units 10 (hereafter, referred to as sensor units 10) which is fixed to respective wheels W, a wheel state information process unit 50 (hereafter, referred to as a wheel ECU 50) fixed to a vehicle body B and an annunciator 100. FIG. 2 is a functional block diagram in a sensor unit 10 and a wheel ECU 50. Since all the sensor units 10 disposed at respective wheels W serve the same function, one of them is shown in FIG. 2.

The sensor unit 10 is attached to a tire air injection valve of a wheel W. The sensor unit 10 comprises a pneumatic sensor 11, a temperature sensor 12, an acceleration sensor 13, a controller 20, an antenna 14, and a battery 15. The pneumatic sensor 11 detects the air pressure of a tire and outputs a detection signal which represents the air pressure P to the controller 20. The temperature sensor 12 detects the temperature of the tire and outputs a detection signal which represents the tire temperature T to the controller 20. The acceleration sensor 13 detects the acceleration in a centrifugal force direction of the wheel W and outputs a detection signal which represents the acceleration G to the controller 20.

The controller 20 comprises a microcomputer and a communication circuit as a principal part, and comprises a timing setting part 21 to set up the timing for transmitting the radio signal, an ID storage part 22 to memorize sensor IDs which are identification information on the sensor units 10, and a transmission treatment part 23 to generate the radio signal and transmit through the antenna 14, from a functional perspective.

The timing setting part 21 sets up the transmission timing of the radio signal based on the acceleration G detected by the acceleration sensor 13 and a transmission time interval. Since the sensor unit 10 containing the acceleration sensor 13 also circles around an axle shaft while the wheel W is rotating, the waveform of the output of the acceleration sensor 13 becomes a pulse waveform with a period corresponding to one revolution of the wheel W as a result of the additional gravitational acceleration. For this reason, the sensor unit 10 can detect the timing when the sensor unit 10 is the uppermost point or the lowermost point of the wheel W, by extracting a pulse component of the acceleration G. Then, the timing setting part 21 sets the timing when the turning position of the sensor unit 10 comes to the uppermost point (or the lowermost point) as the transmission timing of the radio signal, based on the acceleration G.

Since the transmitting interval during running becomes short when the transmission timing of the radio signal is set up simply based on the turning position of the sensor unit 10, a transmitting time interval condition that the transmitting time interval must be a predetermined time (for instance, one minute) or longer is added. That is, after the elapsed time since the transmission of the radio signal at the last time has become the predetermined time or longer, the first timing at which the turning position of the sensor unit 10 comes to a set position (in this example, the uppermost point) is set as the transmission timing of the radio signal.

The timing setting part 21 comprises a clock timer, and measures an elapsed time after the transmission of the radio signal at the last time. And it sets up the transmission timing of the radio signal as mentioned above based on the measured timer value and the change of the acceleration G detected by the acceleration sensor 13, and outputs a transmission instruction to the transmission treatment part 23 when the transmission timing has come. In addition, although the acceleration sensor 13 detects the acceleration G in the centrifugal force direction of the wheel W in this embodiment, alternatively, it may detect the acceleration in a circumference direction of the wheel W. In that case, the timing at which the turning position of the sensor unit 10 comes to the foremost point and the backmost point (intermediate position between the uppermost point and the lowermost point) can be also detected based on the pulse component of the acceleration G. Therefore, the timing setting part 21 can set up the transmission timing according to the direction of the acceleration detected by the acceleration sensor 13.

When the transmitting instruction is inputted from the timing setting part 21, the transmission treatment part 23 reads an air pressure P outputted by the pneumatic sensor 11, a tire temperature T outputted by the temperature sensor 12 and the sensor ID memorized by the ID storage part 22, generates a transmission data containing the air pressure P, the tire temperature T and the sensor ID, and transmits a radio signal modulated with the transmission data through the antenna 14. These air pressure P and tire temperature T are the newest information at the time of the transmission of the radio signal.

The battery 15 supplies a power source to respective electricity loads in the sensor unit 10.

The sensor unit 10 in the present embodiment is configured to be able to transmit only to the wheel ECU 50 (bidirectional communication is impossible), and unilaterally transmits the above-mentioned radio signal at the above-mentioned timing.

Next, the wheel ECU 50 will be explained. The wheel ECU 50 comprises a microcomputer and a communication circuit as a principal part, and comprises a reception treatment part 51, a data processing part 52, a registered ID storage part 53, a wheel location discrimination part 54, and a pulse count part 55, from a functional perspective. Moreover, the wheel ECU 50 is connected to an annunciator 100 disposed near a driver's seat.

The reception treatment part 51 is connected to the antenna 90, and receives the radio signal transmitted from each sensor unit 10 through the antenna 90. Whenever receiving the radio signal, the reception treatment part 51 extracts data representing the sensor ID, the air pressure P and the tire temperature T from the radio signal, and outputs the same to the data processing part 52. Moreover, the reception treatment part 51 outputs the data representing the sensor ID to the wheel location discrimination part 54 at the timing when the radio signal is received from the sensor unit 10.

The data processing part 52 creates annunciation data which is displayed for showing the air pressures P of the four wheels with respect to each wheel location, based on the data inputted from the reception treatment part 51 and the sensor IDs of the four wheels memorized by the registered ID storage part 53.

The registered ID storage part 53 is a non-volatile memory which memorizes the sensor IDs of the sensor units 10 attached to the wheels W of the vehicle in association with their wheel locations. The registered ID storage part 53 comprises a front left wheel ID storage area 53FL which memorizes the sensor ID assigned to the sensor unit 10 of a front left wheel, a front right wheel ID storage area 53FR which memorizes the sensor ID assigned to the sensor unit 10 of a front right wheel, a rear left wheel ID storage area 53RL which memorizes the sensor ID assigned to the sensor unit 10 of a rear left wheel, and a rear right wheel ID storage area 53RR which memorizes the sensor ID assigned to the sensor unit 10 of a rear right wheel. Hereafter, the sensor IDs memorized by the registered ID storage part 53 will be referred to as registered sensor IDs.

The data processing part 52 refers to a correspondence relation between the registered sensor IDs and the wheel locations memorized by the registered ID storage part 53, creates the annunciation data which represents the air pressure Ps of the four wheels according to their wheel locations based on the data inputted from the reception treatment part 51, and outputs the created annunciation data to the annunciator 100. Moreover, the data processing part 52 compares the air pressure Ps with a proper evaluation value Pref for every wheels, and outputs insufficient air pressure wheel location data which identifies the wheel location where the air pressure is insufficient to the annunciator 100 when the air pressure P is less than the proper evaluation value Pref.

In addition, the data processing part 52 also judges whether the tire temperature T has become an unusually elevated temperature based on the inputted tire temperature T, and outputs a tire overheat information to another vehicle controller which is not shown when an overheat status of a tire is detected. Moreover, the data processing part 52 may be configured to output an alarm display instruction to the annunciator 100. Moreover, the data processing part 52 may be configured to correct the proper evaluation value Pref for judging the propriety of a tire pressure based on the tire temperature T.

The annunciator 100 comprises a display disposed in the location which can be sighted from a driver's seat, a display driver which drives the display, and a display microcomputer which controls the display driver, and displays a tire-pressure monitoring screen image on the display according to the annunciation data outputted from the data processing part 52, for example.

Figure 3:
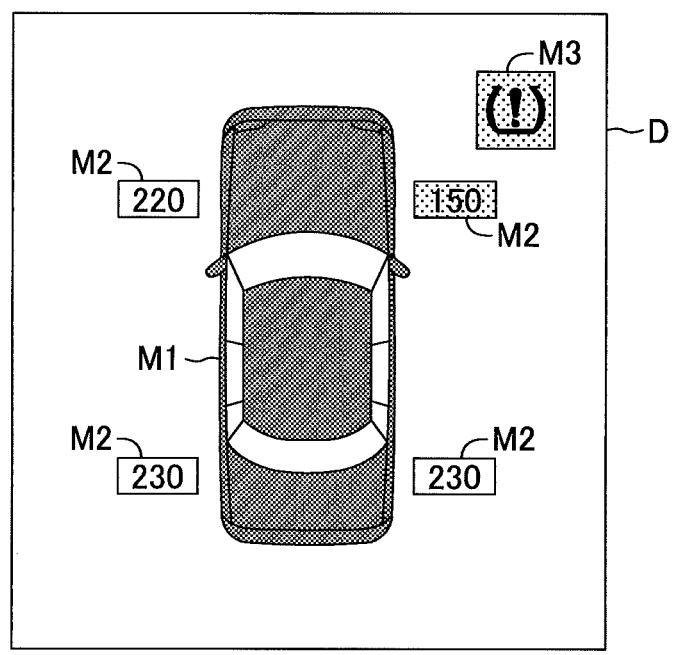
FIG. 3 is a drawing for showing a display screen image which an annunciator displays.

FIG. 3 is a drawing for showing a tire-pressure monitoring screen image D displayed on the display of the annunciator 100. A vehicle body mark M1 representing a top-view pattern of a vehicle body, air pressure value display parts M2 which are disposed beside respective wheel locations and display numerical values of the tire pressures, and a warning mark M3 for calling a driver's attention are displayed on the tire-pressure monitoring screen image D. The annunciator 100 displays the numerical values of the air pressures on the air pressure value display parts M2 based on the annunciation data inputted from the data processing part 52. Moreover, in the case where it is judged that the shortage of air pressure has occurred based on the insufficient air pressure wheel location data, it changes the display mode of the air pressure value display part M2 at the wheel location (for instance, its background color and character color may be changed) and turns on the warning mark M3. The warning mark M3 is configured to be able to be sighted by a driver only when it is turned on, and to be unable to be sighted by a driver when it is turned off. Therefore, a driver can recognize which wheel lacks for air pressure, along with its air pressure value.

At the time of shipment, a vehicle has a correct relation between the registered sensor IDs memorized by the registered ID storage part 53 and the wheel locations. However, when a tire rotation is performed or a wheel W is replaced with another one thereafter, the registered situation (relation between the registered sensor IDs and the wheel locations) becomes wrong.

In order to cope with such an issue, a wheel location discrimination part 54 and a pulse count part 55 are prepared in the wheel ECU 50.

The wheel location discrimination part 54 is a functional part for automatically distinguishing which wheel W has the sensor unit 10 that had transmitted the radio signal received by the reception treatment part 51, that is, to which wheel W the sensor unit 10 specified by the sensor ID contained in the radio signal is attached, by estimation, and identifying its wheel location based on the discrimination result, and registering its sensor ID in the registered ID storage part 53. The pulse count part 55 is a functional part for detecting the wheel rotation location which is needed when the wheel location discrimination part 54 distinguishes the wheel location of the sensor unit 10.

The pulse count part 55 is connected to a brake ECU 200. The brake ECU 200 is a controller which controls the braking force of front-and-rear and right-and-left wheels W, and has the wheel-speed sensors 60 connected therewith. The wheel-speed sensors 60 are respectively prepared on the vehicle body side corresponding to the respective wheels W, and output a predetermined number of pulse signals while the corresponding wheel W rotates one revolution. The wheel-speed sensors 60 in the present embodiment output a pulse signal 96 times while the corresponding wheel W rotates one revolution. That is, a pulse signal is outputted whenever the wheel W rotates a constant angle (3.75 deg. (=360/96)). The brake ECU 200 counts the number of the pulse signals outputted from each wheel-speed sensor 60 (number of output) within a predetermined time period (for instance, 30 milliseconds) respectively, and outputs the count values at the above-mentioned predetermined time interval (period of 30 millisecond). This count value corresponds to the wheel-speed of each wheel. In this example, the count value in the predetermined time period comes to "1" at a vehicle speed of 2 to 3 km/h. Hereafter, this count value will be referred to as a wheel-speed count value.

The wheel-speed count values which this brake ECU 200 outputs is inputted in the pulse count part 55, and the pulse count part 55 acquires the pulse count value representing the number of the pulse signals which each wheel-speed sensor 60 outputs in an accumulation period, by inputting and accumulating the wheel-speed count values according to the wheel location. With this pulse count value, each rotation angle of each wheel W in the accumulation period can be detected. Therefore, based on the rotation location of wheel at an arbitrary timing and the pulse count value acquired by starting counting from the timing, the subsequent rotation location of each wheel can be separately detected.

In addition, although the pulse count part 55 acquires the pulse count value by accumulating the wheel-speed count value outputted from the brake ECU 200 in the present embodiment, alternatively, it may be configured to be directly inputted the pulse signal outputted by the wheel-speed sensor 60 as shown by a dashed line in FIG. 2. In this case, the pulse count part 55 counts the pulse signal which each wheel-speed sensor 60 outputs, one by one.

The pulse count part 55 counts the number of the pulse signals which each wheel-speed sensor 60 outputs (accumulates the wheel-speed count value which the brake ECU 200 outputs) by carrying out a pulse signal count routine which will be mentioned later. In this case, in order to deal with an pulse count value as a value of "96" or less which is the number of the pulse signals for one revolution of the wheel, the pulse count part 55 will return the pulse count value back to "1" when the pulse count value exceeds "96", and will resume counting. The pulse count value thus changed into a value of "96" or less is referred to as a pulse number. Therefore, the pulse number is set to the value which the pulse count value exceeds "96." For instance, when the pulse count value increases as 95, 96, 97, 98, 99 . . . , the pulse number will be set up so as to change as 95, 96, 1, 2, 3 . . . . The pulse number comes to a value representing the remainder resulted from a division of the pulse count value by the number of the pulse signals for one revolution of the wheel.

The wheel location discrimination part 54 reads a pulse number from the pulse count part 55, whenever it receives the radio signal transmitted from each sensor unit 10, it matches with sensor ID of the received radio signal, and memorizes the pulse number of each wheel-speed sensor 60 at the time. That is, a pulse number is sampled.

Figure 4:
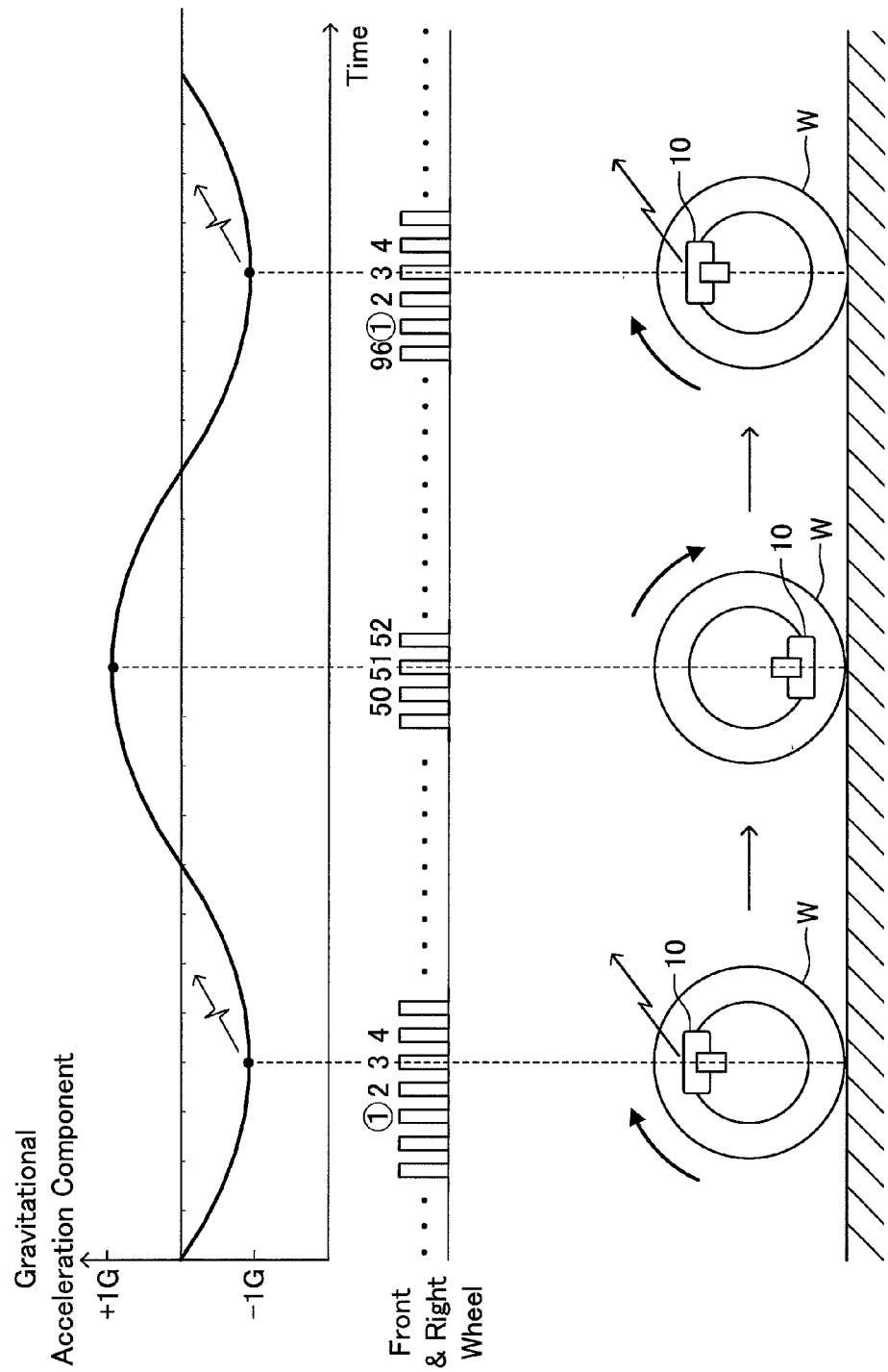
FIG. 4 is a drawing for showing an image of a change of the turning position of a sensor unit and a pulse number.

FIG. 4 is a drawing for showing as an image one example of the relation between the turning position of the sensor unit 10 and the gravitational acceleration component which the acceleration sensor 13 detects, the transmission timing of the radio signal, and the change of the pulse number of the pulse signal outputted from the wheel-speed sensor 60. As mentioned above, the sensor unit 10 transmits the radio signal in the location where its own turning position is the uppermost, that is, in the location where the gravitational acceleration that the acceleration sensor 13 detects becomes −1G. Therefore, the pulse number when the radio signal transmitted by the sensor unit 10 is received will be constant fundamentally, when the sensor unit 10 and the wheel-speed sensor 60 are disposed in a common wheel W. In the example of FIG. 3, the pulse number of the wheel-speed sensor 60 which detects the rotation of a front right wheel when the sensor unit 10 disposed in the front right wheel (FR wheel) transmits the radio signal is always "3."

Respective wheels W do not necessarily rotate at the same speed as one another, and mutual rotational speeds become different due to an inner ring difference, an outer wheel difference and a slip, etc. For this reason, in a case where the pulse numbers of the four wheel-speed sensors 60 at the reception timing of the radio signal are sampled whenever the radio signal is received, the wheel-speed sensor 60 whose pulse number is not changed will be only one with respect to the receiving timing of the radio signal having a specific sensor ID. Therefore, it can be presumed that the wheel W for which the wheel-speed sensor 60 with the pulse number not changed is disposed as the sensor unit 10 specified with the sensor ID attached thereto. The wheel location discrimination part 54 distinguishes the wheel locations of the four sensor units 10 using such a principle.

By the way, when a vehicle stops during the wheel location discrimination, fundamentally, the pulse signal becomes no longer outputted from the wheel-speed sensor 60. However, due to a disturbance, such as getting on and off of a crew member during the vehicle is stopping and the vibration of an engine, a wheel may rotate repeatedly in an oscillation manner forward and backward slightly and a plurality of pulse signals may be outputted from the wheel-speed sensors 60. Therefore, a pulse signal will be counted as if the wheel rotated in one direction, although the wheel was not rotating in fact. For this reason, the pulse number becomes not corresponding to the rotation angle of the wheel W, and it becomes impossible to perform a wheel location discrimination properly.

When the vehicle stops during the wheel location discrimination, such an issue can be solved by restarting the wheel location discrimination treatment from its beginning (namely, discarding the prior data and starting the wheel location discrimination treatment again, after resumption of running). However, the partially sampled data (pulse number) cannot be used, and the time period until the wheel location discrimination treatment is completed will become long. Since a plurality of pulse signals is generated by disturbance like what is called a chattering noise, the pulse signal will be referred to as a chattering noise hereafter.

Then, in the present embodiment, it is configured so that a pulse count value is not increased by disturbance by changing the accumulation method of the wheel-speed count value outputted by the brake ECU 200 (count method of the pulse signal outputted by the wheel-speed sensor 60) when the vehicle speed is within the minute low speed range.

Figure 5:
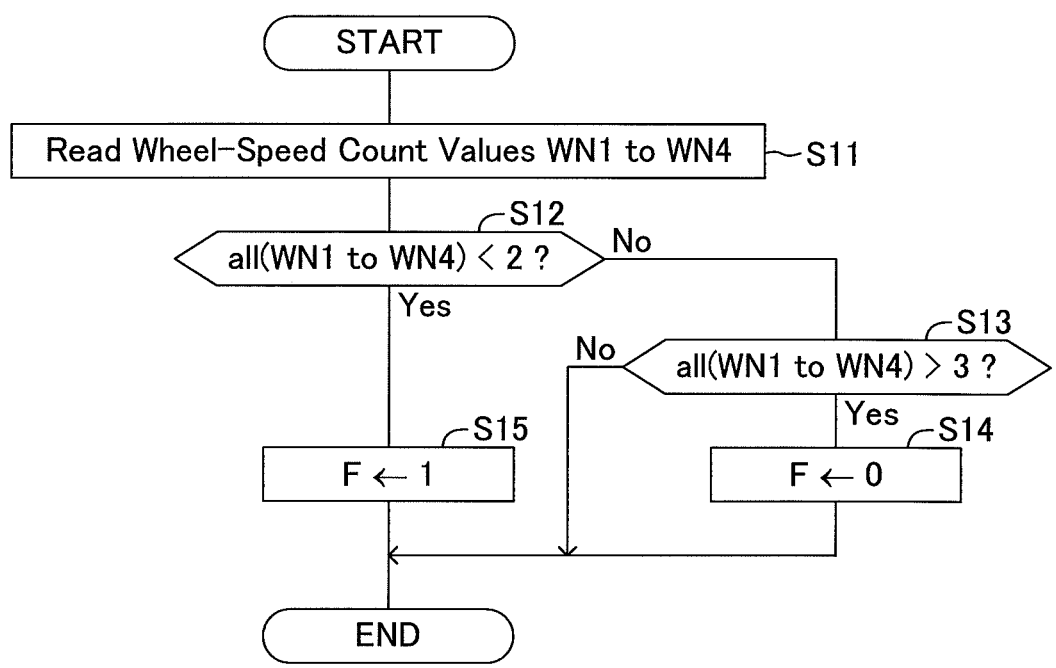
FIG. 5 is a flowchart for showing a flag setting routine.

Hereafter, the treatment which the pulse count part 55 carries out will be explained. The pulse count part carries out a flag setting routine (FIG. 5) and a pulse signal count routine (FIG. 6) in parallel. The pulse count part 55 repeatedly carries out the above-mentioned two routines, while inputting a count instruction of the pulse signal from the wheel location discrimination part 54 (while the wheel location discrimination part 54 is repeatedly carrying out the wheel location discrimination routine which will be mentioned later).

First, the flag setting routine will be explained. The pulse count part 55 reads wheel-speed count values WN1, WN2, WN3 and WN4 of the four wheels (front-and-rear right-and-left wheels) outputted from the brake ECU 200 in step S11. The WN1 represents the wheel-speed count value of the wheel-speed sensor 60 of the front left wheel, the WN2 represents the wheel-speed count value of the wheel-speed sensor 60 of the front right wheel, the WN3 represents the wheel-speed count value of the wheel-speed sensor 60 of the rear left wheel, and the WN4 represents the wheel-speed count value of the wheel-speed sensor 60 of the rear right wheel. The brake ECU 200 counts individually the numbers of the pulse signals outputted from each wheel-speed sensor 60 in a predetermined time (in the present embodiment, 30 milliseconds) respectively, and outputs these count values in a predetermined time period. These count values are the wheel-speed count values WN1, WN2, WN3 and WN4.

In subsequent step S12, the pulse count part 55 judges whether all of the wheel-speed count values WN1, WN2, WN3 and WN4 of the four wheels are less than a minute low-speed evaluation initiation threshold value Nref1. The minute low-speed evaluation initiation threshold value Nref1 is set as a larger value than the value "0" which means that the vehicle is stopping, and the value "2" is set up as the minute low-speed evaluation initiation threshold value Nref1 in the present embodiment (Nref1=2). In addition, the threshold value shown in the drawing is the above-exemplified value.

As will be mentioned later, the wheel location discrimination part 54 starts a wheel location discrimination routine when the vehicle speed reaches at a setting speed (for instance, 20 km/h: a vehicle speed information is provided from the brake ECU) for the first time after the ignition switch was turned on. Moreover, the flag setting routine is started according to an initiation of the wheel location discrimination routine. For this reason, at the point of time when the flag setting routine is started, all of the wheel-speed count values WN1, WN2, WN3 and WN4 of the four wheels are the minute low-speed evaluation initiation threshold value Nref or more. Therefore, the pulse count part 55 judges as "No" in step S12, and advances the treatment to step S13.

In step S13, the pulse count part 55 judges whether all of wheel-speed count values WN1, WN2, WN3 and WN4 of the four wheels are larger than a minute low-speed evaluation end threshold value Nref2. In the present embodiment, the value "3" is set up as the minute low-speed evaluation end threshold value Nref2 (Nref2=3). At the point of time when the flag setting routine is started, all of the wheel-speed count values WN1, WN2, WN3 and WN4 of the four wheels are larger values than the minute low-speed evaluation end threshold value Nref2. Therefore, the pulse count part 55 judges as "Yes" in step S13, advances the treatment to step S14, and set a minute low-speed evaluation flag F as "0." This minute low-speed evaluation flag means that the vehicle speed is not within the minute low speed range (stopping of the vehicle is also included) by "0", and means that the vehicle speed is within the minute low speed range by "1."

The pulse count part 55 will once end the flag setting routine, when the minute low-speed evaluation flag F is set up. The pulse count part 55 repeats the flag setting routine in a predetermined operation period (for instance, the period in which the brake ECU 200 transmits the wheel-speed count values: 30 milliseconds).

When the vehicle speed falls and all of wheel-speed count values WN1, WN2, WN3 and WN4 of the four wheels become less than the minute low-speed evaluation initiation threshold value Nref1 (S12: Yes), the pulse count part 55 advances the treatment to step S15, sets the minute low-speed evaluation flag F as "1", and once ends the flag setting routine. Then, when at least one of the wheel-speed count values WN1, WN2, WN3 and WN4 of the four wheels becomes the minute low-speed evaluation initiation threshold value Nref1 (S12: No), the pulse count part 55 will advance the treatment to step S13. In this case, the pulse count part 55 skips a treatment of step S14 unless all of the wheel-speed count values WN1, WN2, WN3 and WN4 of the four wheels exceed the minute low-speed evaluation end threshold value Nref2. Therefore, the minute low-speed evaluation flag F will be maintained as "1." Then, when all of the wheel-speed count values WN1, WN2, WN3 and WN4 of the four wheels exceed the minute low-speed evaluation end threshold value Nref2, the pulse count part 55 will set the minute low-speed evaluation flag F as "0" in step S14.

Thus, a hysteresis (dead band for judging the minute low speed range) is set up by the difference between the minute low-speed evaluation initiation threshold value Nref1 and the minute low-speed evaluation end threshold value Nref2. Moreover, since it is required for switching the minute low-speed evaluation flag F that all of the wheel-speed count values WN1, WN2, WN3 and WN4 of the four wheels cross the minute low-speed evaluation initiation threshold value Nref1 and the minute low-speed evaluation end threshold value Nref2, a proper hysteresis can be set up. The minute low-speed evaluation initiation threshold value Nref1 and the minute low-speed evaluation end threshold value Nref2 only have to be set up so that the hysteresis is prepared between them. Therefore, in step S13 for judging whether the vehicle speed is increased out of the minute low speed range, it only has to be configured to judge whether the vehicle speed is the minute low-speed evaluation end threshold value Nref2 or more, at least.

Next, the pulse signal count routine (FIG. 6) will be explained. The pulse count part 55 repeatedly carries out the pulse signal count routine in the same operation period as the flag setting routine. The pulse count part 55 judges whether the minute low-speed evaluation flag F is set as "1" in step S21. At the time of a start-up of the pulse signal count routine, the minute low-speed evaluation flag F is set as "0." For this reason, the pulse count part 55 judges as "No", advances the treatment to step S22, and judges whether the minute low-speed evaluation flag F at the last time was "1."

This treatment in step S22 is to judge whether it is immediately after the minute low-speed evaluation flag F has been stitched from "1" to "0", that is, whether it is the timing when the vehicle speed has been increased out of the minute low speed range. Therefore, at the time of a start-up of the pulse signal count routine, the pulse count part 55 judges as "No", and advances the treatment to step S23.

In step S23, the pulse count part 55 calculates the pulse count value PN1, PN2, PN3, and PN4 by separately integrating the wheel-speed count values WN1, WN2, WN3 and WN4. As these wheel-speed count values WN1, WN2, WN3 and WN4, the values read in step S11 of the above-mentioned flag setting routine may be used.

$$PN1=PN1+WN1$$

$$PN2=PN2+WN2$$

$$PN3=PN3+WN3$$

$$PN4=PN4+WN4$$

Initial values of the pulse count values PN1, PN2, PN3 and PN4 are set as zero. Therefore, when the treatment of step S23 is performed for the first time, the pulse count values PN1, PN2, PN3 and PN4 come to the same values as the wheel-speed count values WN1, WN2, WN3 and WN4 at the time.

In addition, as mentioned above, these pulse count values PN1, PN2, PN3 and PN4 are converted into the pulse numbers which cyclically increase from 1 within a range of 96 or less. Since the pulse numbers are values corresponding to the pulse count values PN1, PN2, PN3 and PN4 (values uniquely determined from the pulse count values PN1, PN2, PN3 and PN4) and it is not necessary to especially distinguish the pulse numbers from the pulse count values PN1, PN2, PN3 and PN4, the pulse count values PN1, PN2, PN3 and PN4 converted into the pulse numbers will be hereafter referred to as the pulse numbers PN1, PN2, PN3 and PN4.

When the pulse count values PN1, PN2, PN3 and PN4 are calculated, the pulse count part 55 converts these values into the pulse numbers PN1, PN2, PN3 and PN4, memorizes them, and thereafter once ends the pulse signal count routine. The pulse count part 55 repeatedly carries out the pulse signal count routine in a predetermined operation period. Thereby, the wheel-speed count value WN1, WN2, WN3, and WN4 are sequentially added to the newest pulse numbers PN1, PN2, PN3 and PN4 memorized therein, the resulting added values are converted into the pulse numbers PN1, PN2, PN3 and PN4 (converted into values of 96 or less), and the converted pulse numbers PN1, PN2, PN3 and PN4 are memorized as new pulse numbers.

When the vehicle speed falls and the minute low-speed evaluation flag F changes to "1" (S21: Yes), the pulse count part 55 will advance the treatment to step S24. In step S24, the pulse count part 55 calculates minute low speed count values LN1, LN2, LN3 and LN4. The minute low speed count values LN1, LN2, LN3 and LN4 are values obtained by separately integrating the wheel-speed count values WN1, WN2, WN3 and WN4 in the period when the wheel speed is within the minute low speed range.

$$LN1=LN1+WN1$$

$$LN2=LN2+WN2$$

$$LN3=LN3+WN3$$

$$LN4=LN4+WN4$$

Initial values of the minute low speed count values LN1, LN2, LN3 and LN4 are set as zero. Therefore, when the treatment of step S24 is performed for the first time, the minute low speed count values LN1, LN2, LN3 and LN4 come to the same value as the wheel-speed count values WN1, WN2, WN3 and WN4 at the time.

When the minute low speed count values LN1, LN2, LN3 and LN4 are calculated, the pulse count part 55 will memorize the values and will once end the pulse signal count routine. Such a treatment is repeated and the minute low speed count values LN1, LN2, LN3 and LN4 get larger and larger according to the rotation of respective wheels W. Also during the vehicle is stopping, the treatment of step S24 is being repeated. Therefore, when a chattering noise occurs in the output of the wheel-speed sensor 60 due to a crew member's getting on and off, engine vibration, etc., the noise may be outputted as a pulse signal and the minute low speed count values LN1, LN2, LN3 and LN4 may increase.

In this case, the probability that a chattering noise may occur synchronously from all of the four wheel-speed sensors 60 is very low. This is because it is very rare that all the wheels stop in the wheel rotation location (relative position of the wheel to the wheel-speed sensor 60) where a chattering noise is likely to be generated since there are a wheel rotation location where a chattering noise is likely to be generated due to load fluctuation which acts on a wheel and a wheel rotation location where a chattering noise is difficult to be generated.

Figure 8:
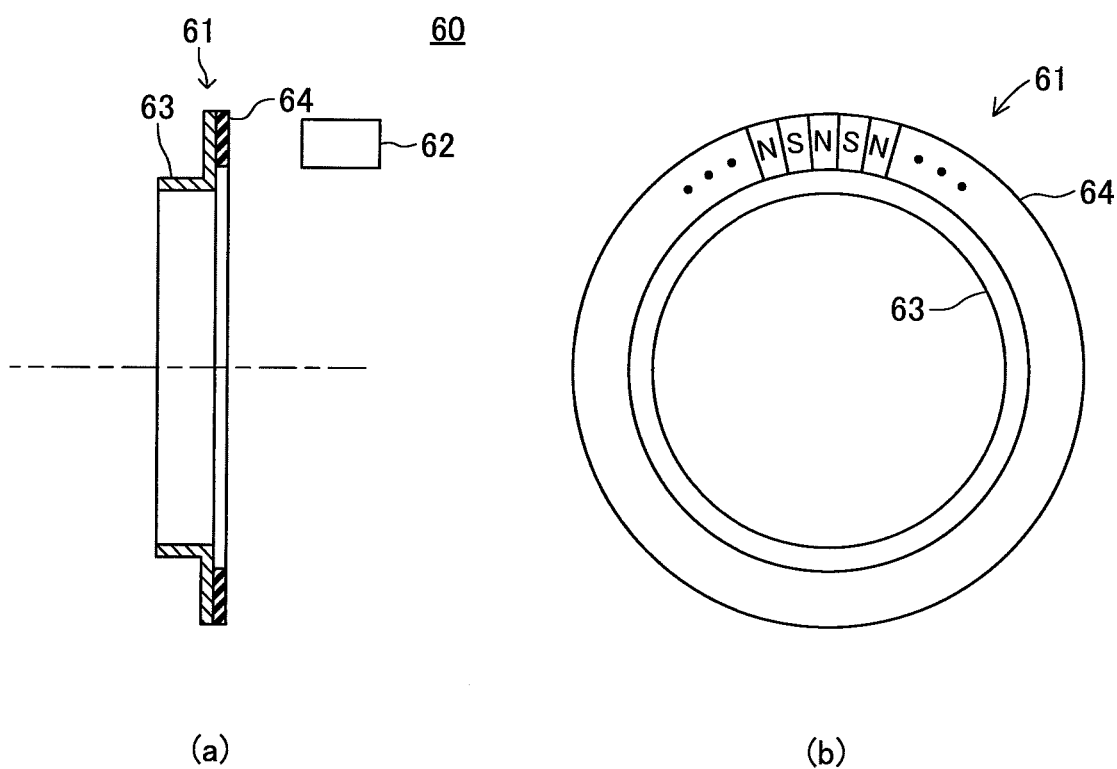
FIG. 8 is a schematic diagram for showing a lateral face (a) and a front face (b) of an encoder.

For instance, the wheel-speed sensor 60 used in the present embodiment is constituted by a magnetic rotor 61 fixed to and built in a hub and an encoder having a magnetic detector 62 which faces the magnetic rotor 61 and fixed inrotatably on the vehicle body side, as shown in FIG. 8. The magnetic rotor 61 comprises a ring-like washer 63 which rotates integrally and concentrically with the hub and a magnetized ring plate 64 fixed to the washer 63. The magnetized ring plate 64 is formed of synthetic rubber (for instance, NBR) material mixed with magnetic material shaped in a ring tabular with a thickness of about 1 mm, and an N pole and an S pole are formed alternately along the circumferential direction.

Figure 9:
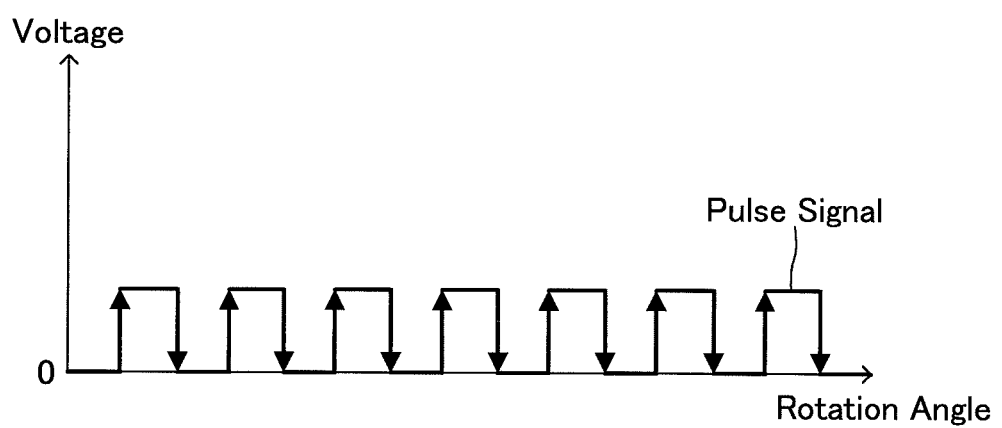
FIG. 9 is a wave form chart of a pulse signal which a wheel-speed sensor outputs.

In this wheel-speed sensor 60, the magnetic detector 62 detects the magnetism of the rotating magnetized ring plate 64, and outputs a pulse signal with a waveform as shown in FIG. 9. In a situation where the wheel W has stopped in a wheel rotation location in which this pulse signal switches, the detected magnetism is likely to cross the threshold value due to an oscillation and a chattering noise is likely to be generated. On the other hand, in a situation where the wheel W has stopped in a location different from the wheel rotation location in which the pulse signal switches, the detected magnetism is difficult to cross the threshold value and a chattering noise is difficult to be generated even when an oscillation arises.

The four wheels are in mutually independent rotation locations. Therefore, the probability that a chattering noise (undesired pulse signal) may be outputted synchronously from the four wheel-speed sensors 60 is small.

Figure 6:
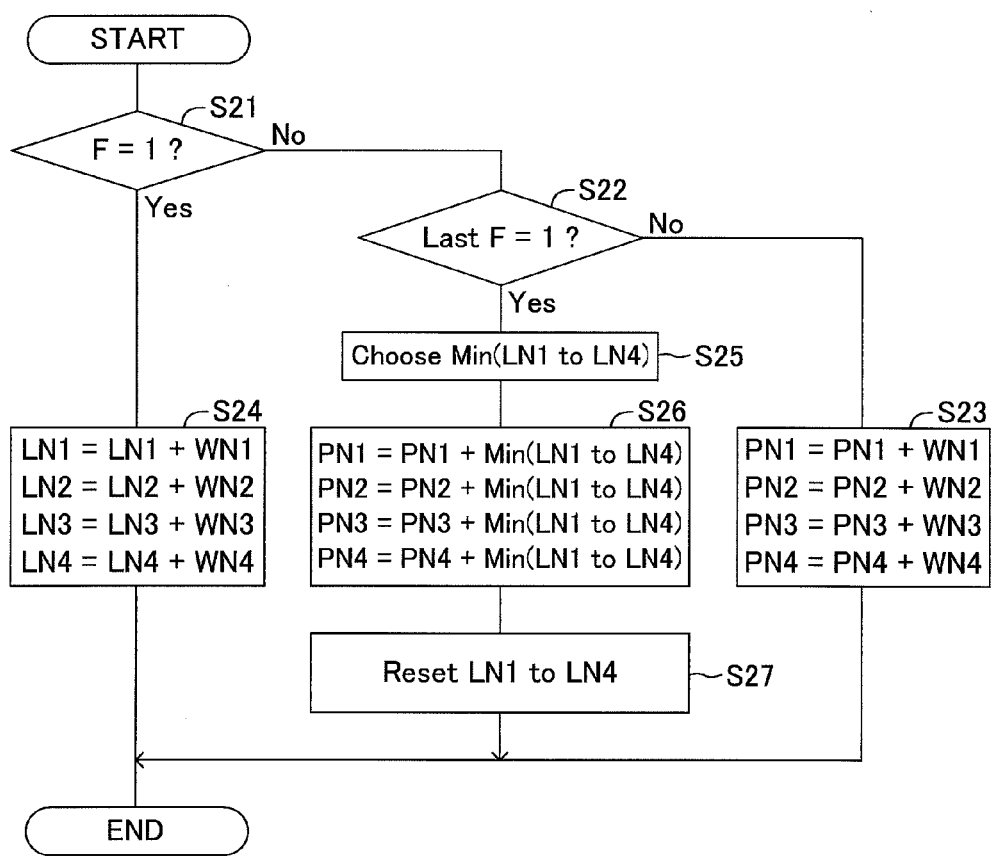
FIG. 6 is a flowchart for showing a pulse signal count routine.

Now, the explanation will be returned to the pulse signal count routine of FIG. 6. When the vehicle speed increases out of the minute low speed range and the minute low-speed evaluation flag F is switched from "1" to "0", the pulse count part 55 will judge as "No" in step S21, and will judge whether the minute low-speed evaluation flag F at the last time was "1" in step S22. That is, it judges whether it is immediately after the minute low-speed evaluation flag F was switched from "1" to "0" or not. The pulse count part 55 advances the treatment to step S25, immediately after the minute low-speed evaluation flag F was switched from "1" to "0."

In step S25, the pulse count part 55 reads the lastly calculated and memorized minute low speed count values LN1, LN2, LN3 and LN4, and chooses the minimum value Min(LN1, LN2, LN3, LN4) among the four values. The pulse count part 55 presumes that this minimum value Min(LN1, LN2, LN3, LN4) is a proper pulse count value during the vehicle speed is within the minute low speed range, i.e., the count value of the pulse signal corresponding to the actual amount of rotation of each wheel W.

Then, in step S26, the pulse count part 55 reads the lastly calculated and memorized pulse numbers PN1, PN2, PN3 and PN4, converts the values obtained by adding the minimum value Min(LN1, LN2, LN3, LN4) chosen in step S25 to these pulse numbers PN1, PN2, PN3 and PN4 into the pulse numbers (converts into a value of 96 or less, when the value exceeds 96), and sets up the converted pulse numbers as new pulse numbers PN1, PN2, PN3 and PN4. That is, the pulse numbers PN1, PN2, PN3, and PN4 which are proper at present are computed by adding the minimum value Min (LN1, LN2, LN3, LN4) set up as proper count values of the pulse signals during the vehicle speed is within the minute low speed range to the pulse numbers PN1, PN2, PN3 and PN4 just before the vehicle speed falls within the minute low speed range.

$$PN1=PN1+Min(LN1,LN2,LN3,LN4)$$

$$PN2=PN2+Min(LN1,LN2,LN3,LN4)$$

$$PN3=PN3+Min(LN1,LN2,LN3,LN4)$$

$$PN4=PN4+Min(LN1,LN2,LN3,LN4)$$

The pulse count part 55 memorizes the computed pulse numbers PN1, PN2, PN3 and PN4.

Then, in step S27, the pulse count part 55 clears the minute low speed count values LN1, LN2, LN3 and LN4 to zero, and once ends the pulse signal count routine. In this way, after the vehicle speed is increased out of the minute low speed range, the treatment in which the wheel-speed count values WN1, WN2, WN3 and WN4 are added to the pulse numbers PN1, PN2, PN3 and PN4 memorized in step S26 is performed in step S23. Therefore, the pulse numbers PN1, PN2, PN3 and PN4 can be maintained at proper values even for a time period including a vehicle-stopping time.

Figure 7:
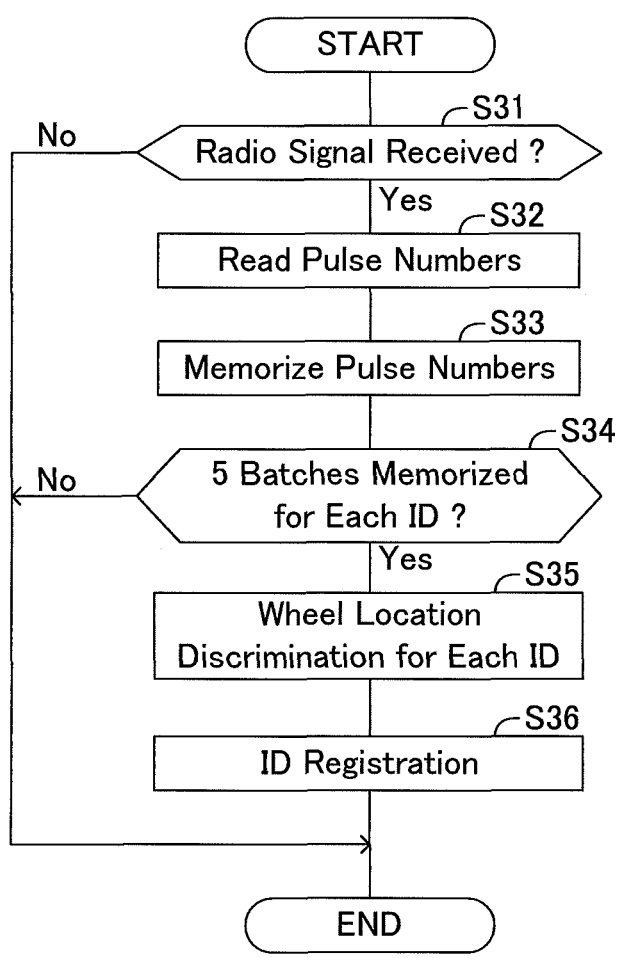
FIG. 7 is a flowchart for showing a wheel location discrimination routine.

Next, the treatment which the wheel location discrimination part 54 carries out will be explained. FIG. 7 is a flowchart for showing a wheel location discrimination routine which the wheel location discrimination part 54 carries out. The wheel location discrimination part 54 starts the wheel location discrimination routine and outputs a count instruction of a pulse signal to the pulse count part 55 at the same time, when the vehicle speed reaches at a setting speed (for instance, 20 km/h: the vehicle speed information is provided from the brake ECU 200) for the first time after the ignition switch was turned on.

When the wheel location discrimination routine is started, the wheel location discrimination part 54 will judge whether the radio signal was transmitted from some of the four sensor units 10 in step S31. The wheel location discrimination part 54 once ends the wheel location discrimination routine when the radio signal is not received. The wheel location discrimination part 54 repeatedly carries out the wheel location discrimination routine in a short predetermined operation period. The wheel location discrimination part 54 will read the pulse numbers PN1, PN2, PN3 and PN4 corresponding to the pulse count values of the respective wheel-speed sensors 60 from the pulse count part 55 in step S32, when the radio signal is received from some of the four sensor units 10 (S31: Yes).

Then, in step S33, the wheel location discrimination part 54 memorizes the pulse numbers PN1, PN2, PN3 and PN4 of the respective wheel-speed sensors 60 which have been read from the pulse count part 55 in association with the sensor IDs of the received radio signal. The non-volatile memory which is not shown is prepared in the wheel ECU 50, and the wheel location discrimination part 54 memorizes the pulse numbers PN1, PN2, PN3 and PN4 of the respective wheel-speed sensors 60 associated with the sensor IDs in this non-volatile memory. As mentioned above, the sensor unit 10 transmits the radio signal when its own turning position becomes the uppermost point. Therefore, either of the pulse numbers PN1, PN2, PN3 or PN4 at the time of the reception of the radio signal represents the wheel rotation location when the sensor unit 10 is located in the uppermost point.

Then, the pulse count part 55 judges whether five batches of the pulse numbers PN1, PN2, PN3 and PN4 were respectively memorized for the sensor units 10 of the four wheels in step S34. That is, it is judged whether the reception of the radio signals and the sampling of the pulse numbers PN1, PN2, PN3 and PN4 at the time of the reception have been performed 5 times for every sensor ID. When the sampling of five batches of the pulse numbers PN1, PN2, PN3 and PN4 has not been completed, the wheel location discrimination routine is once ended. In addition, although the number of times of the sampling of the pulse numbers PN1, PN2, PN3 and PN4 is set up as 5 times in the present embodiment, the number of times of sampling is not limited to 5 times, and just has to be the number of times which is enough for the discrimination of the wheel location.

When five batches of the sampling of pulse numbers PN1, PN2, PN3 and PN4 have been completed for every sensor ID by repeating such a treatment (S34: Yes), the wheel location discrimination part 54 will set up the wheel location of the wheel-speed sensor 60 in which each fluctuation (dispersion) of the pulse numbers PN1, PN2, PN3 and PN4 becomes a minimal for each sensor ID as a wheel location in which the sensor unit 10 specified by the sensor ID is disposed. FIG. 10 is a diagram for showing a sampling image of the pulse numbers PN1, PN2, PN3 and PN4 memorized in the non-volatile memory. The pulse numbers PN1, PN2, PN3 and PN4 of the four wheel-speed sensors 60 when the sensor IDs are received are memorized for every four sensor IDs in the non-volatile memory. This pulse numbers PN1, PN2, PN3 and PN4 become sampling values at the time of five receptions of the radio signal.

In this example, as for the sensor ID1, the pulse number PN2 of the wheel-speed sensor 60 disposed in the front right wheel is always a constant value "3". On the other hand, the pulse numbers PN1, PN3 and PN4 of the wheel-speed sensors 60 disposed in other three wheels change. Therefore, it can be presumed that the sensor unit 10 specified by the sensor ID1 is disposed in the front right wheel. In addition, although a case where the pulse number of one wheel-speed sensor 60 maintains a constant value is shown here for easy understanding, in fact, the pulse number may fluctuate slightly depending on a detection accuracy etc. even though the wheel-speed sensor 60 detects the wheel speed of the wheel W in which the sensor unit 10 is disposed. Therefore, what is necessary is just to choose the wheel location in which the wheel-speed sensor 60, for which the fluctuation (dispersion) of the obtained pulse number is the smallest among the sampled pulse numbers, is disposed.

In other words, the wheel location discrimination part 54 samples a plurality of the count values of the pulse signals of the respective wheel-speed sensors 60 in a period since the radio signals transmitted from respective wheel sensors 10 were received until it receives the following radio signals for every sensor ID, and distinguishes the wheel location in which the wheel-speed sensor 60 which is substantially maintaining a relation that the sampled count value is the whole-number multiple of the number (for instance, 96) of the pulse signals outputted per one revolution of the wheel, as the wheel location where the wheel sensor 10 is disposed.

When the wheel location discrimination part 54 distinguished the wheel locations for respective sensor IDs in step S35, it registers the sensor IDs in the registered ID storage part 53 in subsequent step S36. That is, the sensor IDs distinguished for respective wheel locations memorized presently are overwritten with the sensor IDs distinguished in step S35. After the wheel location discrimination part 54 thus registered the sensor IDs of the four wheels, it ends the wheel location discrimination routine (it does not repeat the same). At this time, the wheel location discrimination part 54 cancels the count instruction of the pulse signals to the pulse count part 55. Thereby, the pulse count part 55 ends the pulse signal count routine and the flag setting routine (it does not repeat the same).

The tire-pressure monitoring device according to the present embodiment as explained above sets up the minimum value of the minute low speed count values LN1, LN2, LN3 and LN4 obtained by counting the numbers of the pulse signals outputted by the wheel-speed sensors during the vehicle speed is within the minute low speed range as the pulse count values in the period. The probability that a pulse signal due to a chattering noise may be synchronously outputted from the four wheel-speed sensors 60 during the vehicle is stopping is small. Therefore, even when the vehicle stops in the middle of the wheel location discrimination routine, the count treatment of the pulse signals can be continued using the proper pulse numbers PN1, PN2, PN3 and PN4. For this reason, when the vehicle stops during the wheel location discrimination, it is not necessary to restart the wheel location discrimination treatment from the beginning, and the data sampled until then can be used effectively. As a result, in accordance with the present embodiment, the time period required for the wheel location discrimination of the sensor units 10 can be shortened.

As the above, although the tire-pressure monitoring device according to the present embodiment has been explained, the present invention is not limited to the above-mentioned embodiment, and various modifications are possible for the present invention unless it deviates from the objective of the present invention.

For instance, although the wheel ECU 50 in the present embodiment carries out the wheel location discrimination treatment automatically whenever a predetermined timing comes (for instance, when the vehicle speed reaches at a setting speed for the first time after a turning-ON operation of an ignition switch), an operation switch (not shown) may be prepared and it may be configured to start the above-mentioned wheel location discrimination treatment when a user operates the operation switch.

Moreover, although the pulse count values PN1, PN2, PN3 and PN4 obtained by accumulating the numbers of pulse signals are converted into the pulse numbers in the present embodiment, it is not necessary to convert them into the pulse numbers, and it may be configured to perform the wheel location discrimination using the pulse count values PN1, PN2, PN3 and PN4 as they are. In this case, the wheel location of the wheel-speed sensor 60 having (a property most similar to) a property that the number of the pulse signals increases by the whole-number multiple of the number (for instance, 96) of the pulse signals outputted per one revolution of the wheel may be set up as the wheel location where the wheel sensor 10 specified by the sensor ID is disposed.

Moreover, although it is configured to report a tire-pressure information by a display screen in the present embodiment, it may be configured to report a tire-pressure information without using a display screen, but using a phonetic announce device instead, for instance.

Moreover, although it is judged whether the vehicle speed is within the minute low speed range based on the wheel speed detected by the four wheel-speed sensors 60 in the present embodiment, it may be configured to judge whether the vehicle speed is within the minute low speed range based on the wheel speed detected by any of the wheel-speed sensors 60. Moreover, it may be configured to acquire a vehicle speed information (information representing the vehicle speed calculated from the detection values of a plurality of the wheel-speed sensors) and judge whether the vehicle speed is within the minute low speed range based on the vehicle speed information.

Moreover, although the wheel location where the sensor unit 10 is fixed is distinguished based on the pulse numbers when the turning position of the sensor unit 10 comes to the uppermost location in a the present embodiment, it may be configured to distinguish the wheel location where the sensor unit 10 is fixed based on the pulse number when the sensor unit 10 passes a plurality of points, such as the uppermost location and the lowermost location, for instance.

REFERENCE SIGNS LIST

10: sensor unit, 11: pneumatic sensor, 12: temperature sensor, 13: acceleration sensor, 14, 90: antenna, 20: controller, 21: timing setting part, 22: ID storage part, 23: transmission treatment part, 50: wheel ECU, 51: reception treatment part, 52: data processing part, 53: registered ID storage part, 54: wheel location discrimination part, 55: pulse count part, 60: wheel-speed sensor (encoder), 100: annunciator, 200: brake ECU, B: vehicle body, W: wheel, PN1 PN2, PN3, PN4: pulse count values (pulse numbers), and LN1, LN2, LN3 LN4: minute low speed count values.

The invention claimed is:

1. A tire-pressure monitoring device comprises:
a plurality of wheel sensors, each of which is fixed to each of wheels of a vehicle and detects a tire pressure of the wheel that it is fixed to, and transmits a tire-pressure information representing the detected tire pressure along with its specific sensor ID as a radio signal, and
a vehicle body side device which is fixed to a vehicle body and performs a notification process for informing a crew member of said vehicle of an information about the tire pressure of each of said wheels, using said sensor ID and said tire-pressure information acquired by receiving said radio signal and a previously memorized relation between said sensor IDs and wheel locations that are locations of said wheels with respect to said vehicle body; and
each of said plurality of wheel sensors is configured to transmit said radio signal at a timing when a sensor turning position which is its turning position around each axle shaft is a predetermined transmitting position, and said vehicle body side device comprises:

a pulse count means to integrate the number of a pulse signal, which is an output signal of each of a plurality of wheel-speed sensors disposed for each of said wheels and is outputted whenever each of said wheels rotates a predetermined angle, to acquire a pulse count value, for each of said wheel-speed sensors, and a discrimination means to distinguish said wheel location of said wheel that each of said wheel sensors is fixed to, based on said pulse count values at a point of time when receiving said radio signal transmitted from each of said wheel sensors, and update said previously memorized relation between said sensor IDs and said wheel locations based on the discrimination result, wherein:

said pulse count means comprises:

a speed evaluation means to judge whether a vehicle speed is within a predetermined minute low speed range, a minimum value acquisition means to integrate the number of said pulse signal which each of said wheel-speed sensors outputs when said speed evaluation means judges that said vehicle speed is within said minute low speed range, for each of said wheel-speed sensors, and to acquire the minimum value among the integrated values, and a count value adjustment means to update said pulse count value for each of said wheel-speed sensors by setting the number of said pulse signal that each of said wheel-speed sensor had outputted when said vehicle speed was judged to be within said minute low speed range to said minimum value when said vehicle speed increases out of said minute low speed range.

2. The tire-pressure monitoring device according to claim 1, wherein:

said speed evaluation means is configured to judge that said vehicle speed has fallen within said minute low speed range when the number per unit time of said pulse signal outputted from each of said wheel-speed sensors becomes less than a first set value for all said wheel-speed sensors, and to judge that said vehicle speed has got out of said minute low speed range when the number per unit time of said pulse signal outputted from each of said wheel-speed sensors becomes equal to or larger than a second set value which is larger than said first set value for all said wheel-speed sensors.

* * * * *